United States Patent [19]

Inaba et al.

[11] Patent Number: 4,768,037
[45] Date of Patent: Aug. 30, 1988

[54] VEHICLE WINDOW GLASS ANTENNA USING TRANSPARENT CONDUCTIVE FILM

[75] Inventors: Hiroshi Inaba; Masao Shinnai; Kazuya Nishikawa; Tamotsu Saitoh; Tokio Tuskada, all of Matsusaka, Japan

[73] Assignee: Central Glass Company, Limited, Ube, Japan

[21] Appl. No.: 134,096

[22] Filed: Dec. 17, 1987

[30] Foreign Application Priority Data

Dec. 19, 1986 [JP] Japan .................................. 61-301415
Dec. 19, 1986 [JP] Japan .................................. 61-301416

[51] Int. Cl.⁴ .............................................. H01Q 1/32
[52] U.S. Cl. .................................................... 343/713
[58] Field of Search ................. 343/704, 711, 712, 713

[56] References Cited

FOREIGN PATENT DOCUMENTS 730131 12/1942 Fed. Rep. of Germany ...... 343/713

Primary Examiner—William L. Sikes
Assistant Examiner—Robert E. Wise
Attorney, Agent, or Firm—Fleit, Jacobson, Cohn & Price

[57] ABSTRACT

The invention relates to an antenna disposed on or in a vehicle window glass such as the rear window glass or the windshield of an automobile to receive FM radio and/or TV broadcast waves. A principal element of the antenna is a transparent and conductive film in the shape of a quadrilateral having a horizontal upper side. The conductive film occupies a major and central area of the window glass at a distance not less than 15 mm from each edge of the glass. A feeding bar formed of a strip of a low-resistivity material is attached to the conductive film so as to extend horizontally along at least a portion of the upper side of the conductive film, and a lead connects the feeding bar to a feeding point on the window glass. A good position of the junction point of the lead and the feeding bar is in the middle of the width of the window glass. When the feeding point and the junction point are in a side marginal region of the window glass it is desirable to provide, as an auxiliary antenna element, a conductive strip which extends above and parallel to the feeding bar from the side marginal region to a central region of the glass and is connected to the feeding bar in the side marginal region.

12 Claims, 4 Drawing Sheets

VEHICLE WINDOW GLASS ANTENNA USING TRANSPARENT CONDUCTIVE FILM

BACKGROUND OF THE INVENTION

This invention relates to a vehicle window glass antenna for receiving broadcast waves, which uses a transparent and conductive film coated on the window glass pane or interposed between two sheets of glass that constitute a laminated glass. The antenna according to the invention is particularly suited to automobiles.

It is known to provide the rear window glass of an automobile with a so-called window glass antenna which is made up of conductive strips disposed on the glass surface in a suitable pattern. However, it is difficult to acquire sufficiently high gains in receiving radio and television broadcast waves by such an antenna because the antenna has to be formed within a narrow area left above or below an array of defogging heater strips usually provided to the rear window glass.

Also it has been proposed to provide the windshield of an automobile with a transparent and conductive film to use it as an antenna for reception of broadcast waves as shown, for example, in JP-UM No. 49-1562. However, vehicle window glass antennas of this type are still under development and have rarely been employed in industrially manufactured cars. Thus far, few of these window glass antennas have exhibited sufficiently high gains in receiving both FM radio broadcast waves and television broadcast waves and have become comparable to conventional whip antennas about 1 m long.

SUMMARY OF THE INVENTION

It is an object of the present invention to provide a vehicle window glass antenna which is of the type using a transparent and conductive film, is practicable as a broadband antenna to receive not only FM radio broadcast waves but also television broadcast waves and is applicable to either the windshield or the rear window glass of an automobile.

According to the invention there is provided a vehicle window glass antenna, comprising as a principal element of the antenna a transparent and conductive film which is attached to a window glass for a vehicle and is in the shape of a quadrilateral having a substantially horizontal upper side, the film being disposed so as to occupy a major and central area of the window glass at a distance of at least 15 mm from each edge of the window glass, a feeding bar which is a strip of a conductive material lower in resistivity than the material of the transparent and conductive film and is attached to the conductive film so as to extend substantially horizontally along at least a portion of the upper side of the conductive film, and a lead which extends from a point on the feeding bar to a feeding point provided on the window glass.

In this invention the transparent and conductive film for use as the principal element of the antenna is formed over a major and quadrilateral area of the window glass on condition that every side of the quadrilateral film is at a distance not less than 15 mm from the adjacent edge of the window glass. By such disposition the conductive film as an antenna element exhibits considerably increased gains in receiving FM radio broadcast waves not only in Japan but also in foreign countries and also in receiving VHF television broadcast waves. The distancing of the antenna element film from the edges of the window glass is effective for avoidance of obstructive influences of the vehicle body on the receiving function of the antenna.

According to the invention the efficiency of the antenna is further enhanced by the provision of the horizontally extending feeding bar along the upper side of the transparent antenna element film. It suffices that the feeding bar extends along only a middle portion of the upper side of the antenna element film, but it is permissible to extend to feeding bar along the whole length of the upper side of the film. Furthermore, the feeding bar may optionally have at least one branch portion which extends toward the lower side of the antenna element film.

It is rather desirable to locate the feeding point above the feeding bar and on or close to the longitudinal center axis of the window glass. However, in this invention it is also possible to locate the feeding point in a side marginal region of the window glass, and such disposition of the feeding point does not seriously adversely affect the receiving gains of the antenna.

As to the junction point of the feeding bar and the lead which extends to the feeding point, irrespective of the location of the feeding point it is suitable that the junction point is on the longitudinal center axis of the window glass or at a horizontal distance of not more than 30 mm from the center axis. However, a window glass antenna according to the invention may optionally comprise an auxiliary antenna element formed of a conductive strip, which extends above and parallel to the horizontal feeding bar from a side marginal region of the window glass to a central region of the glass and is connected to the feeding bar by a conductor line in the side marginal region of the glass, and in such a case the junction point of the feeding bar and the lead extending to the feeding point may be on an end portion of the feeding bar and in the side marginal region of the glass.

The transparent and conductive film as the principal element of the antenna may be coated on the surface of a glass sheet, which is used by itself as a window glass pane or is laminated with another glass sheet by using an adhesive plastic interlayer, or may be interposed together with adhesive plastic interlayers between two sheets of glass that constitute a laminated glass. The same applies to the conductive strip as the auxiliary antenna element.

The feeding bar is formed of a film or foil of a metal sufficiently low in resistivity such as, for example, silver or copper. Depending on the manner of disposition of the principal antenna element, the feeding bar is formed on the surface of the glass pane or interposed between two glass sheets of a laminated glass pane.

The transparent and conductive film used in this invention may be either a monolayer film of, for example, indium-tin-oxide (ITO), indium trioxide or tin dioxide or a multilayer film which has heat-reflecting ability too and comprises, for example, ZnO and Ag, or either $TiO_2$ or $BiO_2$ and Ag, Au and/or Cu. Since any of such conductive films is high in visible light transmittance, the present invention is applicable to either the rear window glass or the windshield of an automobile.

It is possible to use the transparent antenna element film also as a heater element for defogging and ice melting purposes.

DESCRIPTION OF THE PREFERRED EMBODIMENTS

Figure 1:
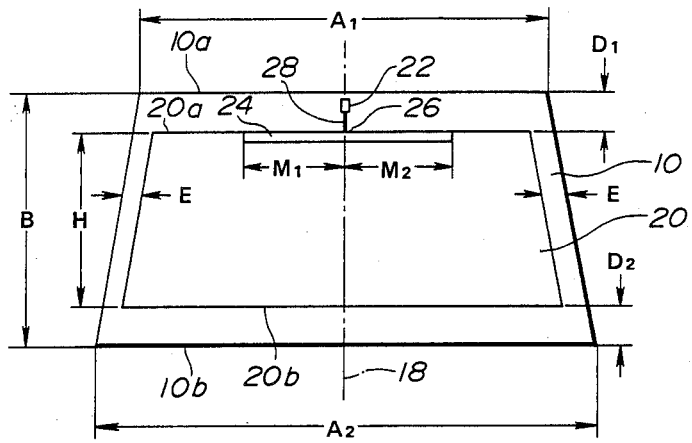
FIG. 1 is a plan view of an automobile window glass provided with a transparent film antenna as a first embodiment of the invention.

FIG. 1 shows an automobile rear window glass embodying the present invention. Numeral 20 indicates an antenna element which is a transparent and conductive film coated on the inboard surface of the glass pane 10. The transparent conductive film 20 has a trapezoidal shape neary similar to the shape of the glass pane 10 and covers a major area of the glass pane 10, but the film 20 is clearly spaced from every edge of the glass pane 10. As a feeding point for the antenna element 20, there is a small terminal 22 formed of a conductive coating film. In this embodiment the feeding point 22 is in the space between the upper edge 10a of the glass pane 10 and the upper side 20a of the antenna element 20 and on the longitudinal center axis 18 of the glass pane 10. A horizontal feeding bar 24 is formed as a strip of a conductive coating film along and in contact with a middle section of the upper side 20a of the antenna element 20, and a short conductor line or lead 28 extends from a middle point 26 of the feeding bar 24 to the feeding point 22 which is to be connected by a feeder (not shown) to a radio or TV receiver.

Figure 2:
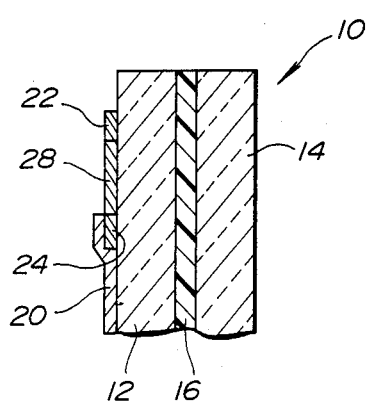
FIG. 2 is a fragmentary and explanatory sectional view of the window glass of FIG. 1.

As shown in FIG. 2 the glass pane 10 may be an ordinary laminated glass made up of two glass sheets 12 and 14 and an intermediate film 16 of a transparent adhesive resin such as polyvinyl butyral. Prior to the lamination operation the feeding point 22, feeding bar 24 and lead 28 are formed by screen-printing a silver paste on the inboard glass sheet 12 and baking the printed paste at the stage of bending the glass sheets 12, 14 in a furnace. The transparent conductive film 20 as the antenna element is either a monolayer film of ITO or $SnO_2$ or a multilayer film comprised of, for example, Ag layer and ZnO layer. On the laminated glass pane 10 the film 20 is formed by sputtering or an alternative physical or chemical vapor deposition method.

Figure 3:
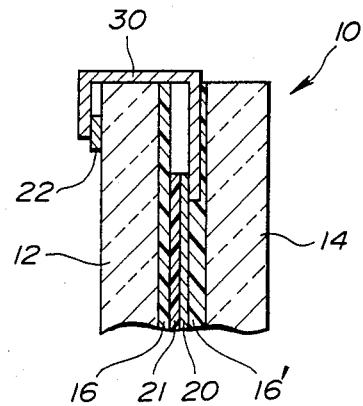
FIG. 3 shows a partial modification of the window glass and antenna of FIGS. 1 and 2 in a fragmentary and explanatory sectional view.
Figure 4:
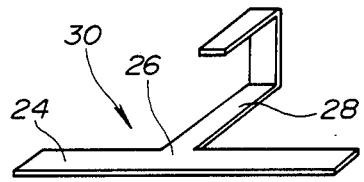
FIG. 4 is an enlarged perspective view of a metal part used in the antenna in FIG. 3.

Alternatively, the transparent conductive film 20 and the feeding bar 24 are interposed between the two glass sheets of the laminated glass pane 10 in the manner, for example, as shown in FIGS. 3 and 4. The transparent conductive film 20 is coated on a polyester film 21, and the laminate of the films 20 and 21 is sandwiched between two interlayers 16, 16' of polyvinyl butyral and interposed between the two glass sheets 12 and 14. In this example, a metal part 30 formed of copper foil is used to provide the feeding bar 24 shown in FIG. 1 and to connect the feeding bar 24 to the feeding point 22 formed on the inboard surface of the glass sheet 12 by printing and baking a silver paste. The metal part 30 has a laterally elongate portion 24 to use as the feeding bar and a lead portion 28, which extends perpendicular to the feeding bar portion 24 from its middle section 26. The feeding bar portion 24 of the metal part 30 is interposed between the two glass sheets 12 and 14 so as to make contact with the transparent conductive film 20 and extend along the upper side of the film 20. The lead portion 28 of the metal part 30 protrudes from the laminated glass pane 10 and is folded so as to come into contact with the feeding point 22 on the glass surface. In this state the assembly shown in FIG. 3 is processed into a laminated glass pane by a usual treatment in an autoclave. The free end of the lead portion 28 of the metal part 30 is soldered to the feeding point 22. The use of this metal part 30 means uniting the feeding bar 24 and the lead 26 into a single member and has a merit that connection of the feeding bar 24 embedded in the laminated glass pane to the feeding point 22 is simplified.

In a sample of the window glass of FIG. 1 the glass pane 10 was 1120 mm in width $A_1$, 1400 mm in width $A_2$ and 570 mm in length B, and the antenna element 20 was 420 mm in length H. The distances $D_1$ and $D_2$ of the antenna element 20 from the upper and lower edges of the glass pane 10 were 80 mm and 70 mm, respectively, and the distance E of each side edge of the antenna element 20 from the side edge of the glass pane 10 was 20 mm. The feeding bar 24 was 600 mm in whole length and 300 mm in both the leftwardly extending length $M_1$ and rightwardly extending length $M_2$.

Gains of this sample antenna in receiving FM radio broadcast waves and TV broadcast waves were measured and compared with gains of a standard dipole antenna. That is, for any frequency the gain of the dipole antenna was taken as the basis, 0 dB, and the gain of the sample antenna was marked on this basis. As the result, gain of the sample antenna was $-14.3$ dB on an average in the Japanese domestic FM radio broadcasting band of 76-90 MHz, $-15.0$ dB on an average in the foreign FM radio broadcasting band of 88-108 MHz and $-18.1$ dB on an average in the 90-222 MHz TV (VHF) broadcasting band. For comparison, by the same testing method a 1 m long whip antenna exhibited average gains (vs. the dipole antenna) of $-16.1$ dB in the 76-90 MHz band, $-19.4$ dB in the 88-108 MHz band and $-23.6$ dB in the 90-222 MHz band. Accordingly the antenna of FIG. 1 is judged to be superior to the whip antenna in efficiency.

Figure 5:
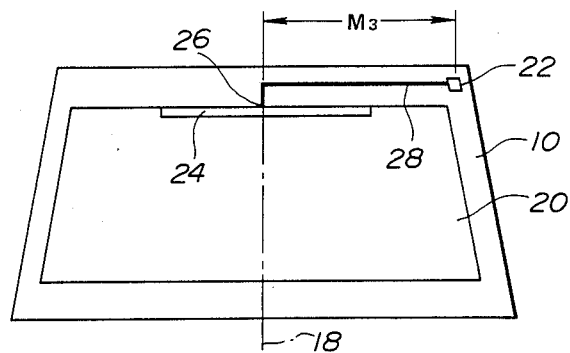
FIG. 5 shows a change in the location of the feeding point for the antenna of FIG. 1.

FIG. 5 shows a partial modification of the window glass antenna of FIG. 1. In this case the feeding point 22 is located close to a side edge of the glass pane 10, so that the lead 28 which extends from the middle point 26 of the feeding bar 24 has a horizontally extending section. The transparent conductive film 20 and the feeding bar 24 are identical with the counterparts in FIG. 1. In a sample of this window glass the horizontal length $M_3$ of the lead 28 was 540 mm, and the other dimensions were the same as in the above described sample of the window glass of FIG. 1.

Gains of this sample antenna in receiving FM radio broadcast waves and TV broadcast waves were measured and compared with gains of a standard dipole antenna by taking the gain of the dipole antenna for any frequency as 0 dB. As the result, gain of the sample antenna was −17.7 dB on an average in the 76–90 MHz FM radio broadcasting band, −19.7 dB on an average in the 88–108 MHz FM radio broadcasting band and −20.3 dB on an average in the 90–222 MHz TV broadcasting band. That is, the change of the location of the feeding point 22 caused slight decreases in the receiving gains.

Figure 6:
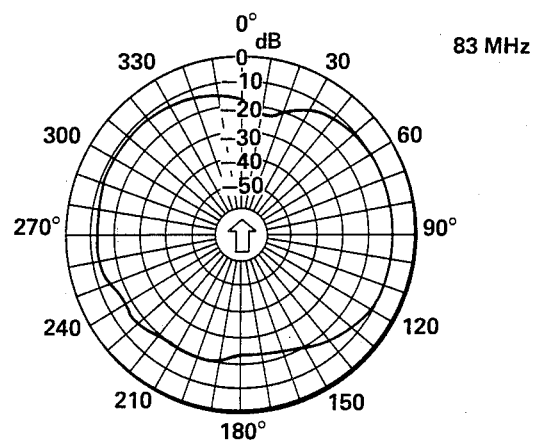
FIGS. 6(A) and 6(B) are diagrams showing directivity patterns of the window glass antenna of FIG. 5 for FM radio broadcast waves of two different frequencies, respectively.
Figure 6:
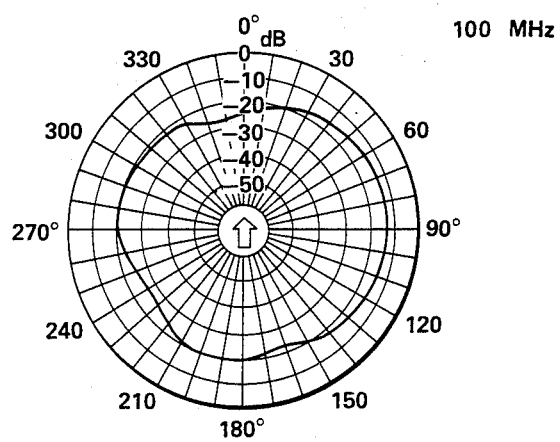

Using the same sample, the directional characteristic of the antenna was measured for incoming waves of several frequencies in the FM band. FIG. 6(A) shows the result for 83 MHz which is a middle frequency of the Japanese domestic FM radio broadcasting band, and FIG. 6(B) shows the result for 100 MHz which is a middle frequency of the foreign FM radio broadcasting band. In the both diagrams the arrow indicates the head direction of the car body on which the sample was installed, and every gain value is on the basis of the gain of a standard dipole antenna. As can be seen the tested antenna exhibited fairly high gains for the incoming waves from every direction and could be regarded as practically nondirectional.

Figure 7:
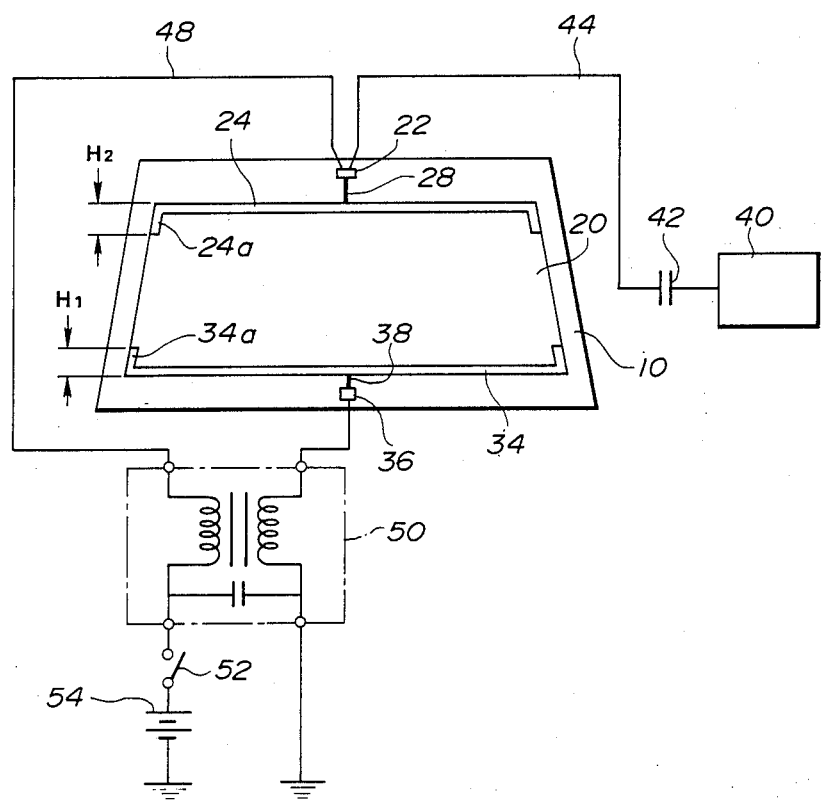
FIG. 7 shows a modification of the transparent film antenna of FIG. 1 to use it also as a heater element for defogging and ice melting purposes.

FIG. 7 shows another modification of the window glass antenna of FIG. 1 to use the transparent conductive film 20 as the antenna element also as a heater element for defogging and ice (frost) melting purposes. The feeding bar 24 is extended along the whole length of the upper edge of the conductive film 20 and, furthermore, in each end portion along the side edge of the film 20. The thus extended feeding bar 24 is used also as a bus bar for supplying a heating current to the film 20. The feeding point 22 is connected by a coaxial cable 44 (1.5C, 2V) to a radio or TV receiver 40 via a capacitor 42 to cut off a DC current. A bus bar 34 is formed along the whole length of the lower edge of the conductive film 20 and in each end portion along the side edge of the film 20, and a lead 38 connects this bus bar 34 to a terminal 36. The feeding point 22 is connected by an insulated wire 48 to the positive terminal of a battery 54 via a noise filter 50 and a switch 52. The terminal 36 is grounded via the noise filter 50.

In a sample of the window glass of FIG. 7, the length $H_1$ of each end portion 34a of the bus bar 34 and the length $H_2$ of each end portion 24a of the feeding bar 24 were both 50 mm. That is, the whole length of the extended feeding bar 24 was 1120 mm. The other dimensions were the same as in the sample of the window glass of FIG. 1. By testing this sample, the antenna of FIG. 7 proved to be nearly equivalent in receiving gains to the antenna of FIG. 1.

As to the whole length of the feeding bar 24 ($M_1+M_2$ in FIG. 1), it is best that the whole length falls in the range of $(\lambda/2)\alpha \pm (\lambda/20)\alpha$, wherein $\lambda$ is the wavelength of a broadcast wave to be received and $\alpha$ is the wavelength shortening coefficient of the window glass antenna (usually $\alpha$ is about 0.7). That is, for receiving FM broadcast waves in the 76–90 MHz band the best length of the feeding bar 24 is 500–700 mm. However, this is not an indispensable requirement. The whole length of the feeding bar 24 may be as short as about 30 mm or as long as about 1200 mm and may include downwardly extending lengths ($H_2$) as in the case of FIG. 7. When the feeding bar 24 is shorter than the upper side 20a of the antenna element film 20 as in the case of FIG. 1, the partial lengths $M_1$ and $M_2$ may not necessarily be equal to each other.

For enhancement of receiving gains of the antenna it is favorable to locate the feeding point 22 on or close to the center axis 18 of the glass pane 10 and connect the feeding bar 24 to the feeding point 22 by a vertically extending lead 28, as in the embodiment shown in FIG. 1. However, even when the feeding point 22 is located in a side marginal region of the glass pane 10 so that the lead 28 has a horizontal length ($M_3$ in FIG. 5) the amount of decrease in the receiving gain of the antenna is not large. Besides, the arrangement of the feeding point 22 and lead 28 in FIG. 5 has a merit that the directional characteristic of the antenna is improved as represented by shallowness of the dips in the directivity patterns of FIGS. 6(A) and 6(B).

Figure 8:
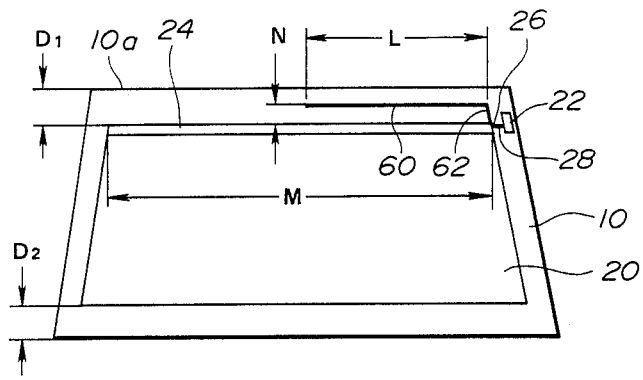
FIG. 8 is a plan view of an automobile window glass provided with an antenna as another embodiment of the invention.

FIG. 8 shows an automobile rear window glass antenna as another embodiment of the invention. Also in this case the principal element of the antenna is the transparent conductive film 20. The horizontal feeding bar 24 extends along the whole length of the upper side of the trapezoidal film 20. As an auxiliary antenna element, a conductive strip 60 formed by using a silver paste extends above and parallel to the feeding bar 24 from a side marginal region of the window glass 10 to a middle region of the glass. This conductive strip 60 is connected in the side marginal region of the glass pane to an end portion of the feeding bar 24 by a vertically extending conductor line 62. The feeding point 22 is located in the same side marginal region of the glass, and the junction point 26 of the lead 28 and the feeding bar 24 is on the end portion of the feeding bar 24. The auxiliary antenna element 60 is at a vertical distance of at least 20 mm from the antenna element film 20, i.e. from the feeding bar 24. It is suitable that the auxiliary antenna element 60 has a length not shorter than 100 mm and preferably in the range from 300 to 700 mm.

In a sample of the window glass of FIG. 8, the dimensions of the glass pane 10 were the same as in the sample of the window glass of FIG. 1. The auxiliary antenna element 60 was 350 mm in length L and 20 mm in its vertical distance N from the element 20. The dimensions of and relating to the film 20 were the same as in the sample of the window glass of FIG. 1 except that the distance $D_1$ of the upper side of the film 20 from the upper edge 10a of the glass pane was reduced to 40 mm. Gains of this sample antenna in receiving FM radio broadcast waves and TV (VHF) broadcast waves were measured and compared with gains of a standard dipole antenna by taking the gain of the dipole antenna for any frequency as 0 dB. As the result, gain of the sample antenna was −18.5 dB on an average in the 76–90 MHz FM radio broadcasting band, −19.6 dB on an average in the 88–108 MHz FM radio broadcasting band and −21.2 dB on an average in the 90–222 MHz TV broadcasting band. Since the aforementioned whip antenna (1 m long) exhibited average gains (vs. the dipole antenna) of −16.1 dB in the 76–90 MHz band, −19.4 dB in the 88–108 MHz band and −23.6 dB in the 90–222 MHz band, the antenna of FIG. 8 can be regarded as a fairly good and practicable antenna.

Figure 9:
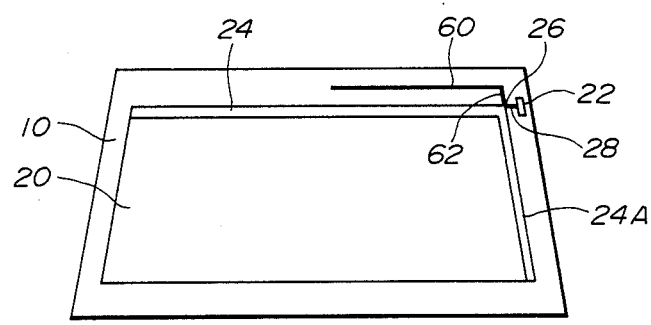
FIGS. 9 and 10 show two modifications of the antenna of FIG. 8, respectively, in the configuration of the feeding bar.

FIG. 9 shows modifying the window glass antenna of FIG. 8 by additionally forming a supplemental feeding bar 24A along the whole length of the righthand side of the conductive film 20. At its upper end the supplemental feeding bar 24A joins with the horizontal feeding bar 24 at its righthand end.

Figure 10:
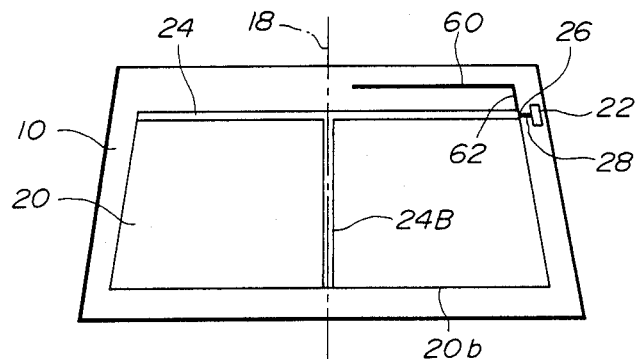

FIG. 10 shows modifying the window glass antenna of FIG. 8 by additionally forming a supplemental feeding bar 24B on the longitudinal center axis 18 of the glass pane 10 so as to extend from a middle point on the horizontal feeding bar 24 to the lower side 20b of the conductive film 20.

Both of the window glass antennas of FIGS. 9 and 10 proved to be nearly equivalent to the antenna of FIG. 8 in gains in receiving FM radio broadcast waves and TV broadcast waves.

What is claimed is:

1. A vehicle window glass antenna, comprising:
   as a principal element of the antenna a transparent and conductive film which is attached to a window glass for a vehicle and is in the shape of a quadrilateral having a substantially horizontal upper side, the film being disposed so as to occupy a major and central area of the window glass at a distance of at least 15 mm from each edge of the window glass;
   a feeding bar which is a strip of a conductive material lower in resistivity than the material of said conductive film and is attached to said conductive film so as to extend substantially horizontally along at least a portion of the upper side of said conductive film; and
   a lead which extends from a point on said feeding bar to a feeding point provided on the window glass.

2. An antenna according to claim 1, wherein said feeding bar extends along at least a middle portion of the upper side of said conductive film and intersects the longitudinal center axis of the window glass, said point on said feeding bar being located on or close to said center axis.

3. An antenna according to claim 2, wherein said feeding bar extends along the whole length of the upper side of said conductive film.

4. An antenna according to claim 2, wherein said feeding point is located above said feeding bar and on or close to said center axis.

5. An antenna according to claim 4, wherein the window glass is a laminated glass and said conductive film is interposed between two glass sheets of the laminated glass, the antenna comprising a metal foil member which has a feeding bar portion to serve as said feeding bar and a lead portion to serve as said lead and is partly interposed between said two glass sheets such that said feeding bar portion is in contact with said conductive film and such that an end portion of said lead portion protrudes from the interface between said two glass sheets, the protruding end portion of said lead portion of said metal foil member being folded so as to come into contact with said feeding point.

6. An antenna according to claim 2, wherein said feeding point is located in a side marginal region of the window glass.

7. An antenna according to claim 1, wherein both said feeding point and said point on said feeding bar are located in a side marginal region of the window glass, the antenna further comprising an auxiliary element formed of a conductive strip which extends above and substantially parallel to said feeding bar from said side marginal region to a central region of the window glass and is connected to said feeding bar by a conductor line in said side marginal region.

8. An antenna according to claim 7, the antenna further comprising a supplemental feeding bar which is a strip of a conductive material lower in resistivity than the material of said conductive film and is attached to said conductive film so as to extend from said feeding bar toward the lower side of said conductive film.

9. An antenna according to claim 8, wherein said supplemental feeding bar extends along a side of said conductive film.

10. An antenna according to claim 8, wherein said supplemental feeding bar extends along said center axis of the window glass.

11. An antenna according to claim 1, wherein said conductive film and said feeding bar are coated on a surface of the window glass.

12. An antenna according to claim 1, wherein the window glass is a laminated glass, and said conductive film and said feeding bar are interposed between two glass sheets of the laminated glass.

* * * * *